United States Patent Office 3,355,489
Patented Nov. 28, 1967

3,355,489
DI-ACID CHLORIDES OF BIS-CARBOXY
CARBORANYL ALKYL ETHERS
Daniel Grafstein, Morristown, and Jack Bobinski, Rockaway, N.J., assignors to Thiokol Chemical Corporation, Bristol, Pa., a corporation of Delaware
No Drawing. Filed July 19, 1963, Ser. No. 296,892
8 Claims. (Cl. 260—544)

The present invention relates to novel compounds containing boron and to methods for making the same.

In recent years, there has been considerable interest in boron-containing compounds because the high heat of combustion of these compounds adapts them to use as rocket fuels. According to the present invention, boron compounds have been prepared, which compounds are useful as intermediates in preparing boron-containing polymers useful as propellant binders. Moreover, the compounds of the present invention are themselves useful as high-energy fuels and as fuel additives. Solid products of this invention, either per se or after formation into a polymer, can be used as solid propellants for rocket power plants and other jet-propelled devices when mixed with suitable oxidizers such as ammonium, potassium, or sodium perchlorates, ammonium nitrate, etc. Such propellant mixtures are compounded by a number of techniques known to the art. For example, the mixtures may comprise from 5 to 35 parts by weight of boron-containing materials and from 65 to 95 parts by weight of solid oxidizing agents mixed therewith. In some cases the propellant may also be made by combining the boron compounds and oxidizers with a curable polymer, for example, of the polyethylene, polyurethane, polyester, or polyether types.

Other products of the invention may be used as additives in high energy liquid fuels by mixing the products with combustible liquids such as compatible hydrocarbon fuels.

The boron-containing compounds of the invention may all be considered derivatives of carborane, which is a compound of carbon, hydrogen and boron, having the empirical formula $C_2H_{12}B_{10}$. Carborane is a solid material melting at 287°–288° C. It is characterized by a surprisingly stable nuclear structure and two labile hydrogen atoms, one connected to each carbon atom. It may be conveniently represented by using the formula $H\theta H$. While there is some difference of opinion as to the molecular structure of carborane, its stability is usually attributed to a basket-shaped molecular configuration in which the ten boron atoms and two carbon atoms may be arranged at the apices of an eicosahedron.

The compounds of the present invention are diacid chloride monomers preparing by chlorinating bis (12-carboxyalkyl-11-carboranylalkyl) ethers or alkali metal salt of bis (12-carboxyalkyl-11-carboranylalkyl) ethers as the following reactions indicate:

(A)
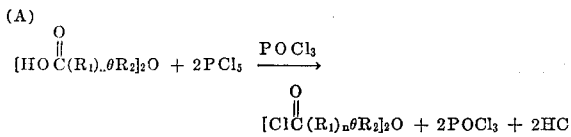

(B)
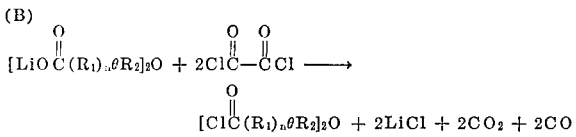

In these formulas, $R_1$ is an alkylene group having from 1 to 6 carbon atoms, $R_2$ represents lower alkylene, $n$ is 0 or 1, and $\theta$ is the carboranyl group, $-C_2B_{10}H_{10}-$.

The reaction between a bis (12-carboxyalkyl-11-carboranylalkyl) ether and phosphorous pentachloride to form a chlorinated ether according to the method disclosed in Reaction A proceeds slowly in refluxing phosphorous oxychloride at elevated temperatures, suitably at the normal boiling temperature of the phosphorous oxychloride (105° C.). However, the reaction may be carried out at temperatures up to about 250° C. but below the decomposition temperature of the reactants, to accelerate the reaction where proper equipment for controlling the heat of reaction and maintaining a suitably pressurized system is available. Similarly, the reaction will take place at lower temperatures than those indicated, but will proceed more slowly. Ordinarily, processing temperatures below 20° C. are not economically attractive. The reaction may proceed between the reactants directly, or in solution as has been indicated.

The reaction between dilithium bis (12-carboxyalkyl-11-carboranylalkyl) ethers according to the method disclosed in Reaction B also proceeds slowly at reflux, but may also be accelerated or retarded by changing the temperature of the reaction in the same manner suggested for Reaction A. This reaction, too may proceed between the reactants directly in the liquid or gaseous states or may be carried out, if desirable, in a solvent medium inert to the reaction.

In all cases, the reactants are suitably maintained in contact for a time permitting substantially complete reaction. The reaction time is not critical, and will vary with the reaction temperature, concentration, etc. as is usual in chemical reactions.

The following specific chemical reactions illustrate the preparation of the products of the present invention:

(1) $B_{10}H_{14} + 2(C_2H_5)_2S \longrightarrow B_{10}H_{12}[(C_2H_5)_2S]_2 + H_2$ (2) $B_{10}H_{12}[(C_2H_5)_2S]_2 + (HC{\equiv}CCH_2)_2O \longrightarrow$
$(H\theta CH_2)_2O + 2(C_2H_5)_2S + H$ (3) $(H\theta CH_2)_2O + 2C_4H_9Li \xrightarrow{Et_2O} (Li\theta CH_2)_2O + 2C_4H_{10}$

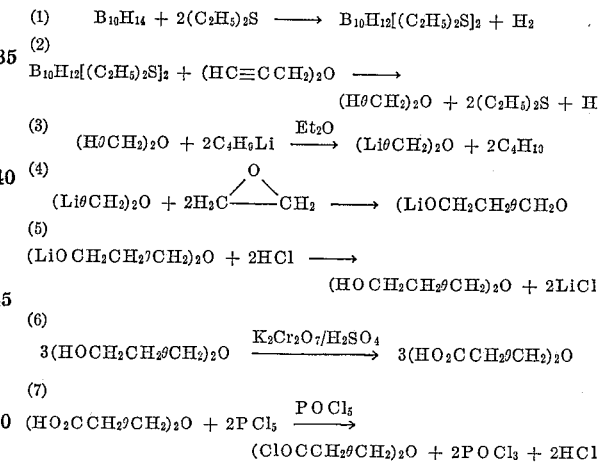

(5) $(LiOCH_2CH_2\theta CH_2)_2O + 2HCl \longrightarrow$
$(HOCH_2CH_2\theta CH_2)_2O + 2LiCl$ (6) $3(HOCH_2CH_2\theta CH_2)_2O \xrightarrow{K_2Cr_2O_7/H_2SO_4} 3(HO_2CCH_2\theta CH_2)_2O$ (7) $(HO_2CCH_2\theta CH_2)_2O + 2PCl_5 \xrightarrow{POCl_5}$
$(ClOCCH_2\theta CH_2)_2O + 2POCl_3 + 2HCl$ The formation of bis (carboranylalkyl) ethers, illustrated by Reactions 1 and 2, is described in copending Fein et al. application Serial No. 269,848, filed March 28, 1963, now U.S. Patent No. 3,247,256. Therein, it is shown that diacetylenic ether may be reacted with a class of disubstituted decaborane derivatives which are coordination compounds formed by the reaction of decaborane with electron-donating sulfur compounds, electron-donating phosphorus compounds, or electron-donating nitrogen compounds. Decaborane, with the loss of its two labile hydrogen atoms, readily reacts with the sulfur or nitrogen-containing molecule to form a coordination compound with a diacetylenic ether in an inert solvent at temperatures typically in the range of 40°–90° C.

The formation of the diacid derivative of the bis (carboranylalkyl) ethers is described in co-pending Grafstein et al. application Serial No. 269,838, filed March 28, 1963, now U.S. Patent No. 3,306,933. Therein, as illustrated by the typical Reactions 3, 4 and 5 appearing above, a bis (carboranylalkyl) ether is reacted with butyl lithium, or other organo-lithium compounds, to form a dilithium-substituted ether. This reaction is suitably carried out in sodium-dried ethyl ether at about 0° C. Thereafter, and conveniently at 0° C., the lithium-substituted ether may be reacted with a cyclic oxyalkyl material like ethylene oxide whereupon the oxyalkyl ring structure is broken and the oxyalkyl radical adds to the dilithium-substituted ether. After hydrolysis, in which the lithium atom is displaced by hydrogen, the diacid monomer may be formed by oxidizing the bis (12-$\beta$-hydroxy alkyl-11-carboranylalkyl) ether as shown in chemical Reaction 6 above, or by other conventional oxidizing procedures well known to those skilled in the art.

An embodiment of the present invention which is most direct and convenient in forming dichlorinated derivatives of the alkali metal salts of bis (12-carboxy-11-carboranylalkyl) ether comprises reacting a bis(12-carboxy-11-carboranylalkyl) ether with excess of oxalyl chloride for two hours under refluxing conditions. The following reaction is exemplary:

(8) $(LiO_2C\theta CH_2)_2O + 2ClOCCOCl \rightarrow$
$(ClOC\theta CH_2)_2O + 2LiCl + 2CO_2 + 2CO$ The use of carbon dioxide to form a lithium substituted carboxy carboranyl compound [the reactant of Reaction 8 above] is disclosed in the co-pending Fein et al. application Serial No. 269,839, filed March 28, 1963, now U.S. Patent No. 3,256,326. Therein, a mole of lithium-substituted ether is reacted with two moles of carbon dioxide gas. This reaction is conveniently carried out at 0°–10° C., whereupon the reaction of Equation 9 takes place:

(9)
$(Li\theta CH_2)_2O + 2CO_2 \xrightarrow{(C_2H_5)_2O} (LiO_2\theta CH_2)_2O$ As is apparent from the procedures and reactions described above, many different diacid chloride ethers may be formed by the method of the present invention. These compounds will be of the general formula

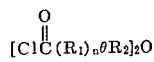

wherein $R_2$ represents lower alkyl whose structure depends on the choice of the diacetylenic ether, symmetrical or unsymmetrical, used in preparing the starting materials for the present process. For example, the diacetylenic ether used in Reaction 2 contributed a —$CH_2$— group to each side of the oxygen linkage of that reaction. It is seen from the sequence of reactions, these —$CH_2$— groups are retained throughout and appear in the diacid chloride products at a position assignable as $R_2$ in the general formula recited above. Therefore, it should be understood that when the diacetylenic ether originally used is of the formula $(HC\equiv CCH_2CH_2)_2O$, for example, products will be formed which contain —$CH_2CH_2$— groups at the $R_2$ position. Thus, it is seen that many diacetylenic ethers may be utilized, each contributing different saturated aliphatic hydrocarbon groups at position $R_2$.

Likewise the configuration of the groups $R_1$ will vary according to the reactants used. $R_1$ suitably represents an alkylene group having 1 to 6 carbon atoms. The two $R_1$ groups in the formula may be the same or different and may be branched or straight-chain.

If the group $R_1$ is derived from ethylene oxide or another epoxy reactant as illustrated by Reactions 3 through 7, $n$ will have the value 1. If a carboxyl group is introduced into a parent ether using carbon dioxide, as illustrated by Reaction 9, $n$ will have the value 0.

A preferred embodiment of this invention is the product

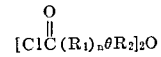

wherein $R_1$ and $R_2$ are each alkylene having 1 to 4 carbon atoms.

In order to point out more fully the nature of the present invention, the following specific examples are given as illustrative embodiments of the present process and products produced thereby.

*Example I*

0.006 mole of bis (12-carboxy-11-carboranylmethyl) ether was added to a suspension of 0.02 mole of phosphorous oxychloride. The mixture was heated at reflux for 1.25 hours. Bis (12-chloroformyl-11-carboranylmethyl) ether formed during the 1.25 hour reaction period. This material was isolated by filtration and purified by recrystallization from n-pentane. The yield was 63% of that theoretically possible. The melting point was in the range of from 84° to 90° C.

*Example II*

Di-lithium bis (12-carboxy-11-carboranylmethyl) ether was added to a quantity of oxalyl chloride. Although the oxalyl chloride stoichiometrically required is only twice the molar quantity of the ether, an excess of the oxalyl chloride was used. The mixture heated under reflux for two hours after which time the reaction was completed. The product, bis (12-chloroformyl-11-carboranylmethyl) ether was isolated and purified.

We claim:
1. A compound of the formula

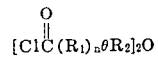

wherein $R_1$ is alkylene having 1 to 6 carbon atoms, $R_2$ is lower alkylene, $n$ is 0 or 1, and $\theta$ is carboranyl,

—$C_2B_{10}H_{10}$—

2. A compound as in claim 1 wherein $R_1$ and $R_2$ are each alkylene having 1 to 4 carbon atoms and $n$ is 1.

3. A compound as in claim 1 wherein $R_2$ is alkylene having 1 to 4 carbon atoms and $n$ is 0.

4. A compound of the formula

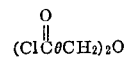

where $\theta$ is carboranyl, —$C_2B_{10}H_{10}$—.

5. A process for chlorinating a bis(12-carboxyalkyl-11-carboranylalkyl)ether of the formula

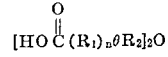

to form compounds of the formula

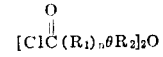

wherein $R_1$ is alkylene having 1 to 6 carbon atoms, $R_2$ is lower alkylene, $n$ is 0 or 1, and $\theta$ is carboranyl,

—$C_2B_{10}H_{10}$— which process comprises reacting said ether with phosphorus pentachloride in refluxing phosphorus oxychloride.

6. A process as in claim 5 wherein said ether is

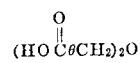

7. A process for chlorinating the dilithium salt of a bis(12-carboxyalkyl-11-carboranylalkyl) ether of the formula

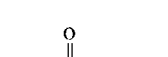

to form compounds of the formula

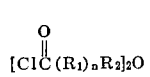

wherein $R_1$ is alkylene having from 1 to 6 carbon atoms, $R_2$ is lower alkylene, $n$ is 0 or 1, and $\theta$ is carboranyl,

—$C_2B_{10}H_{10}$— which process comprises refluxing a mixture of said salt with oxalyl chloride.
8. A process as in claim 7 wherein said dilithium salt is the salt of
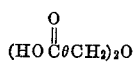
No references cited.
LORRAINE A. WEINBERGER, *Primary Examiner.*
REUBEN EPSTEIN, RICHARD K. JACKSON,
*Examiners.*
L. A. SEBASTIAN, *Assistant Examiner.*